Jan. 29, 1952   G. A. HULL   2,583,846
GARDEN TRACTOR

Filed Sept. 24, 1946   2 SHEETS—SHEET 1

Inventor
GEORGE A. HULL

Jan. 29, 1952  G. A. HULL  2,583,846
GARDEN TRACTOR
Filed Sept. 24, 1946  2 SHEETS—SHEET 2
Fig. 3
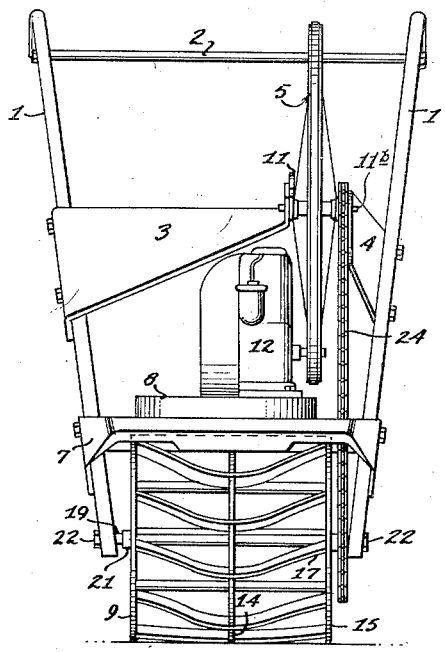
Fig. 4
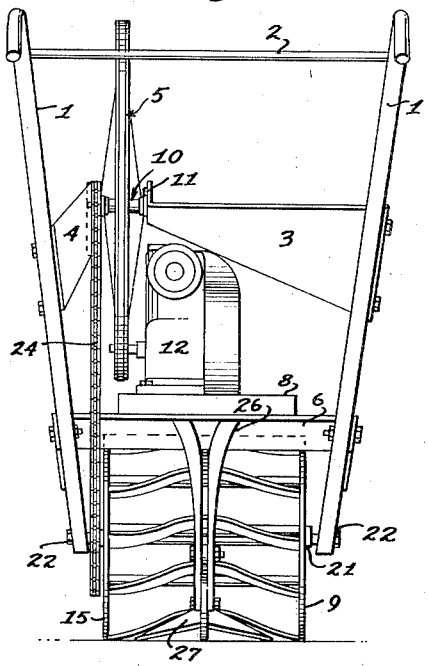
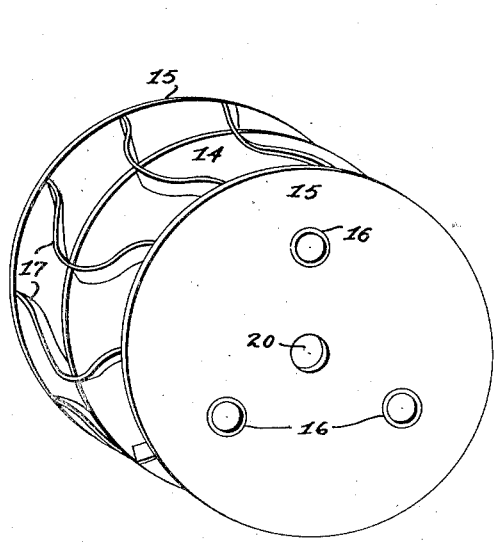
Fig. 5
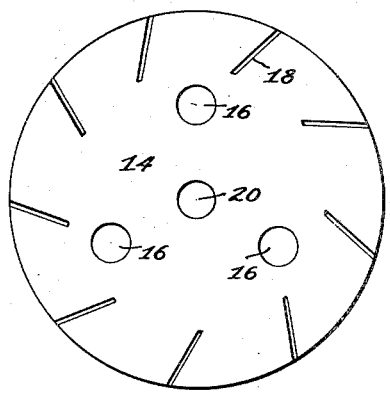
Fig. 6
Inventor
GEORGE A. HULL
By
McMorrow, Berman & Davidson
Attorneys Patented Jan. 29, 1952

2,583,846

UNITED STATES PATENT OFFICE 2,583,846

GARDEN TRACTOR

George A. Hull, Wichita, Kans.

Application September 24, 1946, Serial No. 698,929

3 Claims. (Cl. 97—48)

This invention relates to a garden cultivator, and more particularly to such cultivator of the prime mover type.

An object of the present invention is to provide a garden cultivator of the prime mover type in which movement of the traction wheels supporting one end of the frame in one direction actuates the speed reducing mechanism so as to cause the prime mover to drive the traction wheels.

Another object of the present invention is to provide a garden cultivator of the prime mover type wherein a speed reducing mechanism including a bicycle coaster brake-clutch device carrying a bicycle wheel rim on the hub thereof operatively connects the traction wheels supporting the frame to the prime mover.

Figure 1:
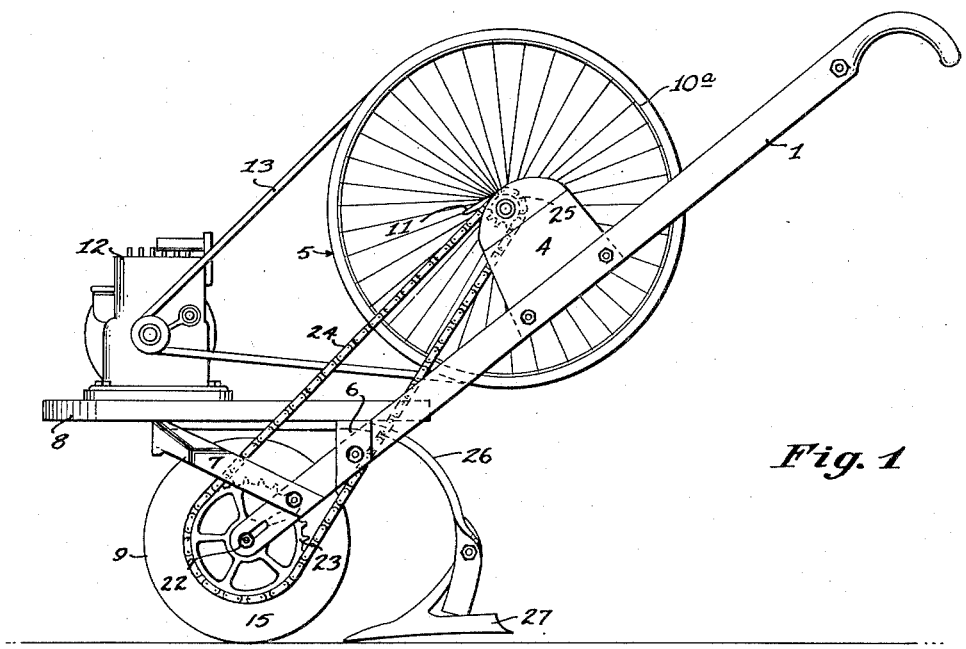
Figure 2:
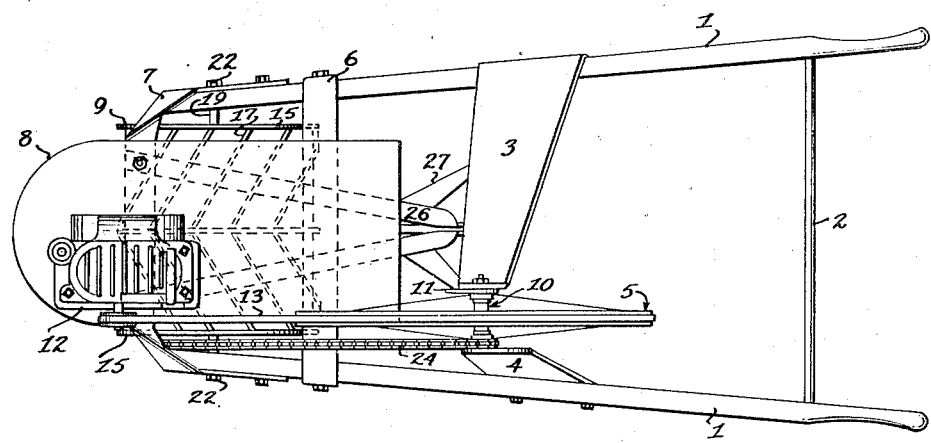

Other objects of the invention will become apparent from the description taken in conjunction with the accompanying drawings, in which Figure 1 shows a side elevation;

Figure 2 a plan view, and

Figure 7:
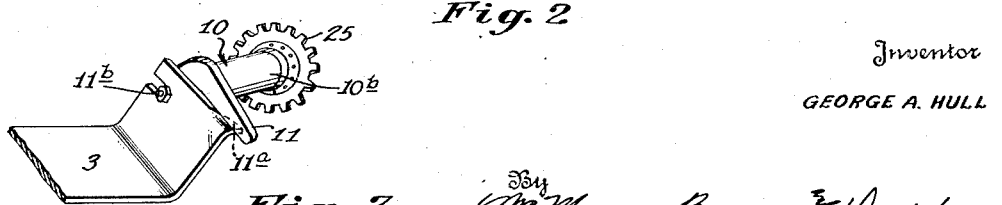

Figures 3 and 4 a front elevation and a rear elevation respectively of the tractor, Figure 5 is a perspective view of the cultivating wheel, or bull-wheel, Figure 6 is a sectional view of the central disc of the bull-wheel, showing the position of the blades, and Figure 7 is a perspective view showing the clutch mechanism and the manner in which it is secured.

Referring now to the drawings in detail, and particularly to Figures 1, 2, 3 and 4, the tractor is equipped with wooden handles 1, to which is bolted a spacing bar 2, mountings 3 and 4 for a speed reducing mechanism 5, mountings 6 and 7 for the motor platform 8, and the bull-wheel 9. While it is not essential that the handles 1 be made of wood, I have found that it is desirable in that less vibration is transmitted to the hands of the operator than when metal handles are used. The spacing bar 2 serves to strengthen the frame and to maintain proper alignment. It is preferably made of metal such as 3/8" bar stock.

The speed reducing mechanism includes a bicycle coaster brake-clutch device 10 having a hub 10b carrying a bicycle rim 10a. An axle 11b rotatably supports the hub 10b, the axle being mounted on iron plates 3 and 4 which are bolted to the wooden handle 1. These mounting plates are made of 10 gauge plate, and serve not only as mountings for the axle 11b but also to strengthen the frame. The upward extending end of the plate 3 is bent over inwardly to form a lug 11a, as shown in Figure 7, the lug bearing against a radial arm 11 attached to the axle 11b of the coaster brake-clutch device 10 to hold the axle against rotation.

Mounting bars 6 and 7 preferably consist of 2-inch angle irons, bent and shaped so as to provide a flat support for the motor platform 8. The bars are bolted to the wooden handles and provide a rugged mounting for the motor 12. The motor platform 8 is made of heavy wood and is secured by bolts to the angle iron mountings 6 and 7. The motor itself 12 may consist of any conventional type. I have found a 5/8 horsepower gasoline engine highly satisfactory for the purpose and capable of delivering an ample amount of power. The motor is operatively connected with the reducing wheel 5 by means of a V-belt 13 or other suitable means.

The cultivator or bull-wheel 9 is attached by a shaft to the lower end of the wooden handles 1 and functions both as a traction wheel and as a cultivator. Its construction may be best understood by reference to Figures 5 and 6. It consists of three vertically-disposed metal discs 14 and 15 which are conveniently about 12 inches in diameter, and which are joined by three reinforcing rods or pipes which fit in the holes 16 in the discs, and are welded to them. The blades of the cultivator consist of nine iron bars 17 bent so that the central portion is displaced transversely, and mounted on the discs somewhat off center as shown. In the embodiment illustrated in the drawings, these bars are set so that the plane of their ends is tangent to a central circle having a radius of about 2 inches. Slots 18 are cut in the middle disc 14 to receive the bars. The ends of the bars are then welded to the outer discs 15. A pipe passes through the central holes 20 in the discs and has bearing holders 21 mounted on its ends and bolted to the outside of the discs 15. A metal shaft 19, about 1/2 inch in diameter, passes through the pipe and through small sealed bearings contained in the bearing holders 21. The ends of the shaft are threaded and secured to the wooden handles by nuts 22. A bicycle sprocket 23 is bolted directly to one of the outer discs 15 and is spaced from it by the bearing holder 21. This sprocket is connected by means of a drive chain or bicycle link chain 24 to a sprocket 25 carried by the hub 10b of the coaster brake-clutch device 10, the sprocket 25 being of a diameter smaller than the sprocket 23.

Bolted to the underside of the motor platform 8 are iron draw bars 26 which curve downwardly at the rear of the platform, and on which a duck-foot plow 27 or other implement is bolted.

In operating the tractor as a plow and cultivator, the motor is started, producing by means of the V-belt rotation of the reducing wheel 5. The coaster brake 10 will be in the "coasting" position in which there is no engagement between the wheel or the coaster brake casing and the sprocket or brake shaft. When it is desired to start the tractor, the operator pulls back on the wooden handles, thus tending to move the bull-wheel in a clockwise position (as viewed in Figure 1). This produces an engagement of the coaster brake clutch and causes the bull-wheel to be driven in a counter-clockwise direction by the motor, and the tractor to move forward. The resistance of the ground to the cultivating action of the tractor is sufficient to maintain the engagement of the clutch and to continue the direct drive of the bull-wheel for as long as the operator desires. When he wishes to stop the tractor, he merely pushes on the wooden handles to overcome the ground resistance or, in other words, to make the bull-wheel move forward as fast or faster than it is being driven. This immediately throws the coaster brake into the coasting position and causes the rotation of the bull-wheel to stop, while that of the reducing wheel continues. It is thus possible for the operator to start and stop the tractor in a very simple manner without releasing his grip on the handles with which he is guiding the tractor.

When the tractor is in operation, the duckfoot plow digs into the ground and exerts a gripping action which holds the tractor and particularly the bull-wheel firmly against the ground. This insures good traction, especially on hard ground, and enables the bull-wheel to do an efficient job of cultivating. As the bull-wheel turns, its blades chop into the ground and exert a pressing action. As the blades rotate out of the ground, dirt is pushed backward and falls off the blades. They are thus, by virtue of their shape and position, self-cleaning, and throw up a minimum amount of dust.

Many other attachments may be connected to and used with the tractor, as for example by bolting to the draw-bars in place of the plow. In general, unless the implement so attached has a digging action similar to that of a plow, the bull wheel will function solely as a traction wheel and will not dig into or cut the sod.

My tractor is light, inexpensive to build, versatile, efficient, and more convenient to operate than any other garden tractor with which I am acquainted.

While I have described and illustrated my novel tractor according to specific embodiments thereof, it is to be understood that many variations may be made in the size, materials of construction and arrangement of the elements without departing from the spirit or scope of my invention which is not to be limited except as set forth in the appended claims.

I claim:

1. In a garden cultivator, a support frame including handles, a traction wheel supporting one end of the frame and rotatably mounted therein, a sprocket wheel attached to said traction wheel, a prime mover mounted upon the support frame, a bracket secured to the support frame and spaced from the prime mover, a speed reducing mechanism including a bicycle coaster brake-clutch device having a hub carrying a bicycle wheel rim and an axle rotatably supporting said hub and mounted in said bracket, a radial arm on said axle, said bracket including a part engaging said arm to hold said axle against rotation, a drive connection between the prime mover and said wheel rim, a second sprocket wheel on said hub and of a diameter smaller than said first named sprocket wheel, and a chain drive between said first and second named sprocket wheels, whereby movement of the traction wheel and frame in one direction will actuate the speed reducing mechanism so that the prime mover will drive the traction wheel.

2. In a garden cultivator, a support frame including handles, a traction wheel journaled upon the lower end of the support frame and supporting such lower end, a sprocket wheel attached to said traction wheel, a substantially horizontal platform mounted upon the support frame above the traction wheel, an engine mounted upon the platform, a pair of opposed sheet metal brackets secured to the handles above the platform and extending transversely of the handles and spaced longitudinally of the engine, a speed reducing mechanism including a bicycle coaster brake-clutch device having a hub carrying a bicycle wheel rim and an axle rotatably supporting said hub and mounted in said brackets, a radial arm on said axle, one of the brackets including a lug engaging said arm to hold said axle against rotation, a drive connection between the prime mover and said wheel rim, a second sprocket wheel on said hub and of a diameter smaller than said first named sprocket wheel, and a chain drive between said first and second named sprocket wheels.

3. A garden cultivator comprising a support frame including upwardly inclined transversely spaced handles, a traction wheel journaled upon the lower end of the support frame and supporting such lower end, a sprocket wheel attached to said traction wheel, a substantially horizontal platform mounted upon the support frame and disposed above the traction wheel, a prime mover mounted upon the platform, a pair of laterally oppositely disposed sheet metal brackets secured to the handles rearwardly of and above the platform and including inner opposed substantially vertical extensions which are laterally spaced, speed reducing mechanism including a bicycle coaster brake-clutch device having a hub carrying a bicycle wheel rim and an axle rotatably supporting said hub and mounted in said vertical extensions, a radial arm on said axle, one of said brackets including a lug engaging said arm to hold said axle against rotation, a drive connection between the prime mover and said wheel rim, a second sprocket wheel on said hub and of a diameter smaller than said first named sprocket wheel, a chain drive between said first and second named sprocket wheels, and a cultivating implement secured to a support frame and depending therefrom and disposed rearwardly of the traction wheel for creating a drag to retard the forward movement of the traction wheel.

GEORGE A. HULL.

REFERENCES CITED

The following references are of record in the file of this patent:

UNITED STATES PATENTS

| Number | Name | Date |
|---|---|---|
| 818,962 | Holland | Apr. 24, 1906 |
| 1,034,907 | Grant et al. | Aug. 6, 1912 |
| 1,325,244 | Galardi et al. | Dec. 16, 1919 |
| 1,471,180 | McCrary | Oct. 16, 1923 |
| 1,550,291 | Stull et al. | Aug. 18, 1925 |
| 1,629,296 | Quellet | May 17, 1927 |
| 1,807,784 | Geffroy | June 2, 1931 |
| 1,831,221 | Zeilinger | Nov. 10, 1931 |
| 2,220,705 | Burckes | Nov. 5, 1940 |
| 2,312,972 | Orr | Mar. 2, 1943 |
| 2,359,358 | Dielschneider | Oct. 3, 1944 |
| 2,372,026 | Smith | Mar. 20, 1945 |